US011976561B2

(12) United States Patent
Asti et al.

(10) Patent No.: US 11,976,561 B2
(45) Date of Patent: May 7, 2024

(54) TURBINE WITH A SHROUD RING AROUND ROTOR BLADES AND METHOD OF LIMITING LEAKAGE OF WORKING FLUID IN A TURBINE

(71) Applicant: Nuovo Pignone Tecnologie—S.r.l., Florence (IT)

(72) Inventors: Antonio Asti, Florence (IT); Leonardo Tognarelli, Florence (IT); Simone Marchetti, Florence (IT); David Gentile, Florence (IT); Enrico Federighi, Florence (IT)

(73) Assignee: Nuovo Pignone Tecnologie—S.R.L., Florence (IT)

( * ) Notice: Subject to any disclaimer, the term of this patent is extended or adjusted under 35 U.S.C. 154(b) by 0 days.

(21) Appl. No.: 17/310,138

(22) PCT Filed: Jan. 24, 2020

(86) PCT No.: PCT/EP2020/025031
§ 371 (c)(1),
(2) Date: Jul. 20, 2021

(87) PCT Pub. No.: WO2020/151925
PCT Pub. Date: Jul. 30, 2020

(65) Prior Publication Data

US 2022/0090510 A1 Mar. 24, 2022

(30) Foreign Application Priority Data

Jan. 25, 2019 (IT) ........................ 102019000001173

(51) Int. Cl.
*F01D 25/24* (2006.01)
*F01D 11/00* (2006.01)
(Continued)

(52) U.S. Cl.
CPC ............ *F01D 11/18* (2013.01); *F01D 11/001* (2013.01); *F01D 9/041* (2013.01); *F01D 11/005* (2013.01);
(Continued)

(58) Field of Classification Search
CPC ........ F01D 11/025; F01D 11/18; F01D 11/08; F01D 11/005; F01D 11/24; F01D 25/12;
(Continued)

(56) References Cited

U.S. PATENT DOCUMENTS 1,666,626 A * 4/1928 Lösel .................... F01D 25/265
415/108
1,692,538 A * 11/1928 Baumann ................ F01D 25/26
415/138
(Continued)

FOREIGN PATENT DOCUMENTS

CN 1692179 A 11/2005
CN 101881188 A 11/2010
(Continued)

*Primary Examiner* — Justin D Seabe
*Assistant Examiner* — Behnoush Haghighian
(74) *Attorney, Agent, or Firm* — Paul Frank + Collins P.C.

(57) ABSTRACT

A gas (or steam) turbine is disclosed including: a rotor with at least one array of rotor blades, a stator with a casing and a shroud ring; the shroud ring extends around the array of blades rotor and the casing extends around the shroud ring. The shroud ring has radial size independent from temperature due to its material and is movably coupled with the casing so to allow the casing of the stator to thermally expand and contract during operation of the turbine while maintaining the shroud ring radial size. Also, the rotor thermally expands and contracts during operation of the turbine, and, at working temperature, tip regions of the rotor
(Continued)

blades are in close proximity to an inner region of the shroud ring so that clearance is small or zero at working condition.

14 Claims, 6 Drawing Sheets

(51) Int. Cl.
*F01D 11/18* (2006.01)
*F01D 9/04* (2006.01)
*F01D 11/02* (2006.01)
*F01D 11/08* (2006.01)
*F01D 25/26* (2006.01)

(52) U.S. Cl.
CPC ............ *F01D 11/025* (2013.01); *F01D 11/08* (2013.01); *F01D 25/246* (2013.01); *F01D 25/26* (2013.01); *F05D 2220/32* (2013.01); *F05D 2230/642* (2013.01); *F05D 2240/11* (2013.01); *F05D 2240/30* (2013.01); *F05D 2240/55* (2013.01)

(58) Field of Classification Search
CPC .......... F01D 25/005; F01D 9/04; F01D 9/041; F01D 25/246
See application file for complete search history.

(56) References Cited

U.S. PATENT DOCUMENTS 2,494,178 A * 1/1950 Imbert .................... F01D 11/18 415/136
4,112,582 A * 9/1978 Beckershoff ............ F01D 25/24 33/655
4,251,185 A * 2/1981 Karstensen ............ F01D 11/08 415/113
4,306,909 A 12/1981 Oda et al.
4,784,569 A 11/1988 Sidenstick et al.
4,786,232 A * 11/1988 Davis .................... F01D 25/246 415/138
5,952,110 A 9/1999 Schell et al.
6,142,731 A * 11/2000 Dewis ..................... F01D 11/18 415/173.1
6,382,905 B1 * 5/2002 Czachor ................ F04D 29/526 415/128
6,733,233 B2 * 5/2004 Jasklowski ........... F01D 11/025 415/173.3
7,189,057 B2 * 3/2007 Lee ......................... F01D 11/16 415/128
7,686,575 B2 * 3/2010 Chehab ................. F01D 25/246 29/889.22
8,231,338 B2 * 7/2012 Ballard, Jr. ............. F01D 25/26 415/214.1
8,616,839 B2 * 12/2013 Ballard, Jr. ............. F01D 25/26 415/173.1
8,784,052 B2 * 7/2014 Shi .......................... F01D 25/26 415/214.1
8,834,105 B2 * 9/2014 Albers .................. F01D 11/005 415/173.1
8,967,951 B2 * 3/2015 Klingler ................ F01D 25/246 415/214.1
9,441,501 B2 * 9/2016 Ballard, Jr. ............. F01D 25/28
9,835,171 B2 * 12/2017 Kimmel ................ F04D 29/541
9,945,239 B2 * 4/2018 Przybyl ................. F04D 29/541
10,077,782 B2 * 9/2018 Zhang ..................... F01D 11/18
10,677,098 B2 * 6/2020 Shirota ................. F01D 25/246
10,920,609 B2 * 2/2021 Condat ................. F01D 25/005
11,111,822 B2 * 9/2021 Tableau .................. F01D 11/08
11,143,050 B2 * 10/2021 Roy Thill ............... F01D 11/08
11,174,747 B2 * 11/2021 Roy Thill ............... F01D 11/08
11,174,795 B2 * 11/2021 Lutjen ....................... F02C 7/28
11,466,586 B2 * 10/2022 Sippel ..................... F01D 11/08
2003/0202876 A1 * 10/2003 Jasklowski ........... F01D 25/246 415/135
2005/0063827 A1 3/2005 Ochiai et al.
2006/0285972 A1 12/2006 Nicoll et al.
2010/0150730 A1 6/2010 Sellars et al.
2010/0284792 A1 * 11/2010 Ballard, Jr. ............. F01D 25/26 415/214.1
2011/0274538 A1 * 11/2011 Shi .......................... F01D 25/26 415/200
2012/0045312 A1 * 2/2012 Kimmel .................. F01D 9/041 415/139
2012/0171027 A1 * 7/2012 Albers .................. F01D 25/246 415/208.1
2012/0243976 A1 * 9/2012 Ballard, Jr. ............. F01D 25/28 415/173.1
2013/0177413 A1 * 7/2013 Klingler ................ F01D 11/025 29/889.22
2014/0037445 A1 * 2/2014 Ballard, Jr. ............. F01D 25/28 415/214.1
2015/0267544 A1 9/2015 Gurt Santanach et al.
2015/0292341 A1 * 10/2015 Przybyl ................... F01D 9/042 415/214.1
2016/0097296 A1 4/2016 Ballard, Jr. et al.
2018/0306057 A1 * 10/2018 Condat ................... F01D 5/187
2020/0131938 A1 * 4/2020 Tableau ................ F01D 25/246
2021/0156311 A1 * 5/2021 Lutjen ....................... F02C 7/28
2021/0254503 A1 * 8/2021 Roy Thill ............... F01D 25/12

FOREIGN PATENT DOCUMENTS

CN 104718349 A 6/2015
DE 19812380 A1 1/1999
EP 2930307 A1 10/2015
JP 856134561 A 10/1981
JP H09125907 A 5/1997
JP F09250304 A 9/1997
JP 2006348942 A 12/2006
JP 2009235476 A 10/2009
JP 2016075273 A 5/2016
JP 2018159301 A 10/2018

* cited by examiner

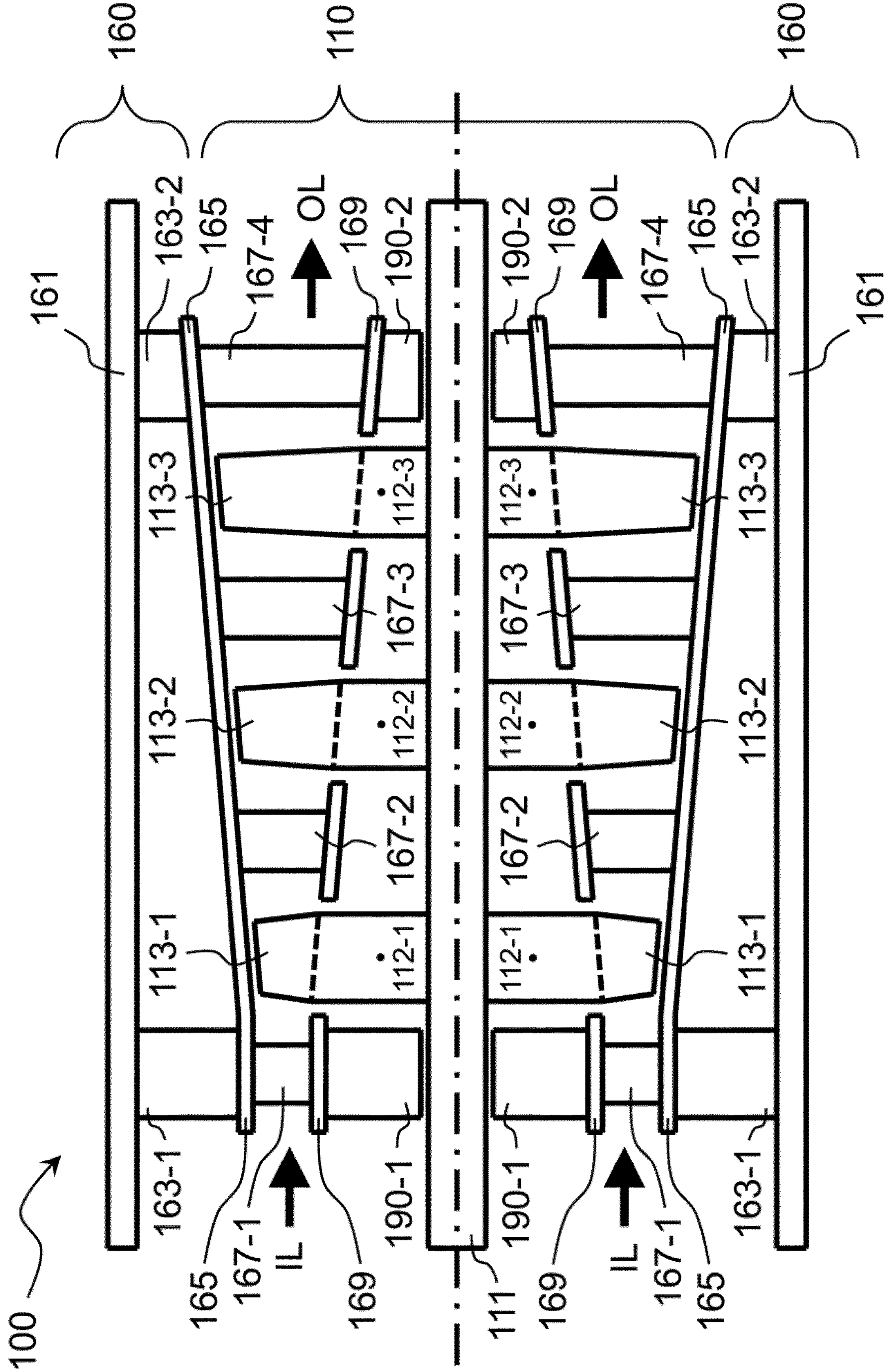
Fig. 1 - Related Art

TURBINE WITH A SHROUD RING AROUND ROTOR BLADES AND METHOD OF LIMITING LEAKAGE OF WORKING FLUID IN A TURBINE

TECHNICAL FIELD

The subject-matter disclosed herein relates to turbines generally, and more particularly to gas turbines and steam turbines, having an embodiment of a new shroud ring around their rotor blades, and to new methods of limiting leakage of working fluid in a turbine, in particular around tips of the rotor blades within the turbine.

Background Art

Gas turbines are machines designed to process a working fluid, such as air, that flows inside a flow passage during operation of the machine; in particular, a gas turbine transfers kinetic energy from the flowing working fluid to a rotor of the machine thus turning its rotor.

Turbine efficiency can be defined as the ratio of output mechanical rotor power to input mechanical working fluid power. Turbine efficiency is negatively affected by leakage of working fluid occurring at tips of rotor blades during working operation of the turbine.

FIG. 1 illustrates a very schematic cross-section view of a known (hot-gas) turbine 100. Turbine 100 comprises a rotor 110 and a stator 160. Rotor 110 comprises a shaft 111 and e.g. three wheels 112 fixed to shaft 111; a first wheel 112-1 has a first array of blades 113-1 (corresponding to a first expansion stage); a second wheel 112-2 has a second array of blades 113-2 (corresponding to a second expansion stage); a third wheel 112-3 has a third array of blades 113-3 (corresponding to a third or last expansion stage). Stator 160 comprises a casing with a shell 161 and an internal annular flow passage directing working fluid from inlet IL to outlet OL. The annular flow passage is defined by a stator outer wall 165 and a stator inner wall 169, and inside it there are provided arrays of rotor blades (in FIG. 1 there are e.g. three arrays of rotor blades 113-1, 113-2 and 113-3) and arrays of stator vanes (in FIG. 1 there are e.g. four arrays of stator vanes 167-1, 167-2, 167-3 and 167-4). Stator outer wall 165 (that may be made of several rings directly and/or indirectly joined together) is fixed to the shell 161 through e.g. annular members; in FIG. 1, there are e.g. two annular elements 163-1 and 163-2. Stator inner wall 169 (that is made of several rings) is fixed to outer wall 165 through e.g. arrays of vanes; in FIG. 1, there are e.g. four inner wall rings respectively fixed to outer wall 165 through e.g. four arrays of vanes 167-1, 167-2, 167-3 and 167-4. Rotor 160 is rotatively coupled to stator 110; for this purpose, in FIG. 1, there are two bearings 190-1 and 190-2 each positioned between an inner wall ring and shaft.

However, in the hot-gas turbine of FIG. 1, leakage of working fluid can occur in the clearance between tips of rotor blades 113-1, 113-2, 113-3 and stator outer wall 165; however, the clearance avoids contact and therefore damages to both the outer wall (that is steady) and the blades (that rotate) during operation of the turbine. By appropriately choosing the size of the clearance, contact (and therefore damages) may be avoided at any operating condition.

U.S. Pat. No. 4,784,569 provides a solution for limiting leakage in a (hot-gas) turbine. According to this solution, an appropriately shaped shroud ring around the tips of the rotor blades provides a satisfactory gas seal so that most of the working fluid passes between the blades for efficient energy extraction, and very little is lost by passing over the periphery of the blades. However, in a (hot-gas) turbine at the working temperature, any shroud ring deforms (for example it radially curves inwardly or outwardly) and such deformation can cause damaging contact between the shroud ring and the blades. The shroud ring in the '569 patent is shaped so that it deforms thermally but maintains a running clearance from the blades. Thus, leakage of working fluid can still occur with this type of shroud ring.

Thus, it would be desirable to create a new turbine with low or even no leakage over the periphery of the rotor blades during working operation of the turbine (therefore with smaller clearances than were possible or contemplated by prior technology and designs (including zero clearance) between the tips of the rotor blades and a surface of the shroud ring) and with very little or no risk of contact damage; in particular, it would be desirable to avoid damage of the rotor blades due to contact with the stator: not only A) at working operating condition when the blades rotate at full speed and both the rotor and the stator are hot, but also B) at start-up and shut-down when the blades rotate slowly and both the rotor and the stator are cold, and C) during ramp-up when the blades increase their speed, the rotor is hot and the stator is cold, and D) during ramp-down when the blades decrease their speed, the rotor is cold and the stator is hot.

SUMMARY

According to one aspect, the subject-matter disclosed herein relates to a turbine comprising a rotor, a stator and a shroud ring; the rotor comprises at least one array of rotor blades, the shroud ring extends around the array of rotor blades, the stator comprises a casing extending around the shroud ring; the shroud ring is movably coupled with the casing so to allow the casing to thermally expand and contract thereby varying a radial distance between the casing and the shroud ring during operation of the turbine.

Although the present invention was conceived for being applied to gas turbines (in particular its first expansion stages, more in particular its first expansion stage), it may be well applied also to steam turbines.

According to another aspect, the subject-matter disclosed herein relates to a method of limiting leakage of working fluid between a rotor and a stator in a turbine during working operation of the turbine; the turbine comprising at least one rotor wheel with an array of rotor blades and a stator casing extending around the array of rotor blades; the stator casing has radial size dependent from its temperature; the rotor wheel has radial size dependent from its temperature; the method comprising the steps of: arranging a shroud ring having radial size substantially independent from its temperature, positioning the shroud ring concentrically about the rotor wheel, between the array of rotor blades and the stator casing, and mechanically coupling the shroud ring with the casing so that coupling is maintained independently from a temperature of the shroud ring and from a temperature of the casing; at working temperature of turbine, tip regions of the rotor blades of said array are in close proximity to or in contact with an inner region of the shroud ring.

As it will be better explained in the following, a stator casing is made of one or more materials, typically metallic materials, that expand when heated and contract when cooled; therefore, such a stator casing increases its sizes, including its radial size, when heated and decreases its sizes, including its radial size, when cooled. On the contrary, the new shroud ring is made of a material (or more materials)

that expands very little when heated and contract very little when cooled this derives for example from a coefficient of thermal expansion lower than 10 μm/m/° C.; therefore, such a shroud ring increases its sizes, including its radial size, very little when heated and decreases its sizes, including its radial size, very little when cooled.

It is to be noted that, as it will be better explained in the following, when the tip regions of the rotor blades of said array are in contact with an inner region of the shroud ring, only a light abrasion occur without any contact damage.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein:

FIG. 1 illustrates a schematic longitudinal-section view of a prior-art turbine;

DETAILED DESCRIPTION OF EMBODIMENTS

Figure 5:
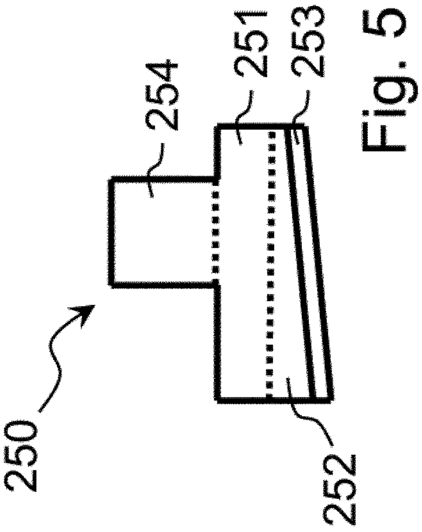
FIG. 5 illustrates a partial schematic longitudinal-section view of a shroud ring of the turbine of FIG. 2.
Figure 4:
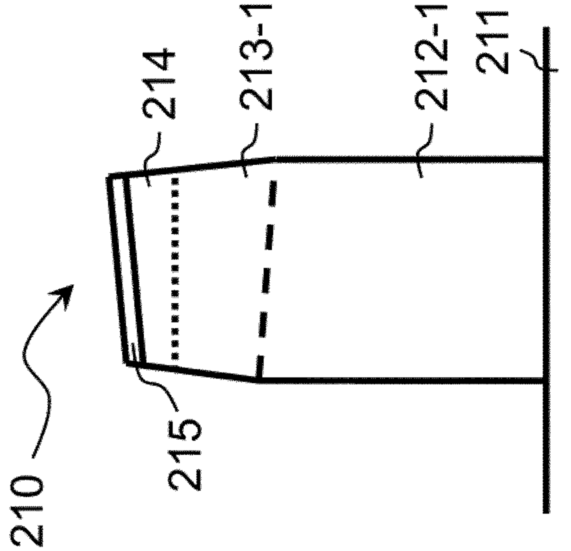
FIG. 4 illustrates a partial schematic longitudinal-section view of a rotor of the turbine of FIG. 2.
Figure 3:
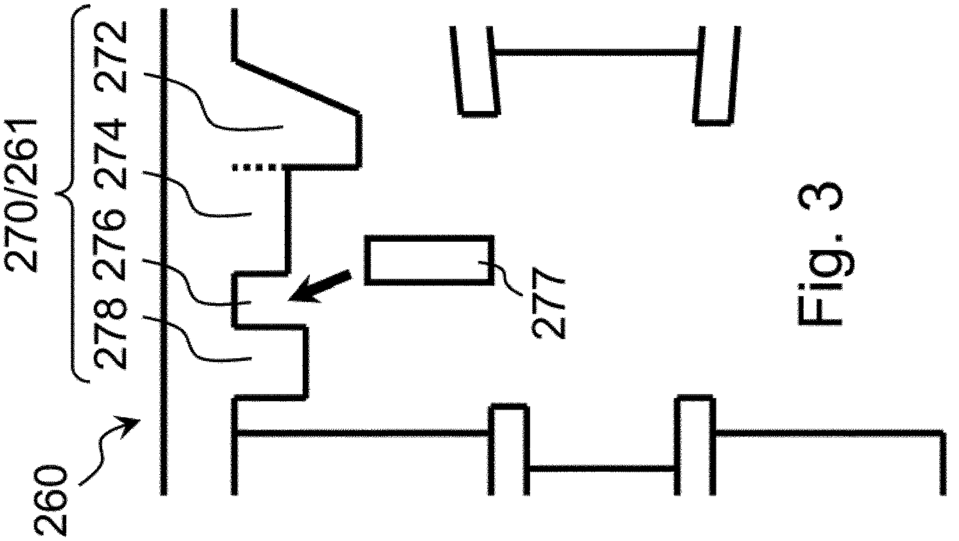
FIG. 3 illustrates a partial schematic longitudinal-section view of a stator of the turbine of FIG. 2.

When a (hot-gas) turbine is working, its components have and maintain substantially constant working temperatures. In considering this condition, the inventors have discovered that it is possible to ideally choose the shape and the size of the turbine components so that there is no leakage of the working fluid over the periphery of the rotor blades during operation of the turbine. In fact, it has been discovered that, unlike prior turbine designs, the clearance between tips of the turbine rotor blades (see e.g. blades 113-1, 113-2 and 113-3 in FIG. 1) and a stator member, for example a fixed shroud ring, extending around the rotor blades (see e.g. outer wall 165 in FIG. 1) is null. In this way, the turbine efficiency would be maximum at working condition, which is desirable.

During ramp-up of the turbine, the temperatures of the turbine components vary significantly, for example there may be temperature increases of 100-400° C.; to be precise. It is to be noted that each turbine component is subject to a different temperature increase, and that temperature increases do not occur everywhere at the same time; in general, first the turbine rotor heats up and then the turbine stator heats up.

During ramp-down of the turbine, corresponding temperature decreases occur, but, in this case, first the turbine rotor cools down and then the turbine stator cools down.

When the temperature of a turbine component varies, its sizes vary; in particular, a temperature increase corresponds to sizes increases and a temperature decrease corresponds to sizes decreases.

If above-mentioned ideal choice is made, at start-up and shut-down of the turbine, clearance between the tips of the rotor blades and the surrounding stator member is null or small, which is positive.

However, if the above-mentioned ideal choice is made, the turbine blades will get in contact with the stator member extending around them during ramp-up of the turbine as at least one turbine wheel together with its blades will thermally expand before the surrounding stator member; consequently, damages will occur to the blades and the member.

It has been realized that leakage of working fluid over the periphery of turbine rotor blades at start-up, shut-down, ramp-up and ramp-down has a negligible effect on overall turbine efficiency as these operating phases last for relatively short times if compared with the working operating phase.

As disclosed herein, the new turbine is arranged to have low or no leakage when the rotor is hot and thus high efficiency is achieved in particular at working condition, i.e. during working of the turbine. For this purpose a shroud ring is positioned around at least one array of turbine rotor blades providing a satisfactory working fluid seal when the rotor is hot. Such shroud ring is not rigidly coupled with the turbine stator; mechanical coupling of the shroud ring with the stator, in particular with the turbine casing, is such as to allow the casing to thermally expand (and contract) without effecting the position of the shroud ring and thus the leakage at any operating condition of the turbine. The shroud ring (see e.g. member 250 in FIG. 7) and the turbine casing (see e.g. member 261 in FIG. 7) may be radially slidably coupled through a set of keys (see e.g. members 280-1, 280-2, 280-3, 280-4 in FIG. 7).

Preferably, the shroud ring of the new turbine has sizes substantially independent from its temperature. Initially, when the rotor is cold, there is some leakage in the clearance between rotor and ring; at this stage, the stator is cold and coupled with the rotor; see e.g. FIG. 9. Afterwards, when the rotor heats up, the rotor expands, clearance reduces to zero or almost to zero, and consequently also leakage reduces to zero or almost to zero; at this stage, the stator is still cold and coupled with the rotor; see e.g. FIG. 10. Finally, the rotor is hot and expanded, and clearance as well as leakage remain zero or almost zero; at this stage, the stator heats up and expands but remains coupled with the rotor; see e.g. FIG. 11.

Although the present invention was conceived for being applied to gas turbines (in particular its first expansion stages, more in particular its first expansion stage), it may be well applied also to steam turbines.

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

When introducing elements of various embodiments the articles "a", "an", "the", and "said" are intended to mean that there are one or more of the elements. The terms "comprising", "including", and "having" are intended to be inclusive and mean that there may be additional elements other than the listed elements.

Referring now to the drawings, figures from FIG. 2 to FIG. 8 are different views of a same first embodiment of a (hot-gas) turbine configured with a new type of shroud ring. In particular, these figures are views at a first expansion stage of the turbine. However, the same solution or a similar solution may be used at any expansion stage of a turbine. Furthermore, the same solution or a similar solution may be used at several expansion stages of a turbine.

Figure 2:
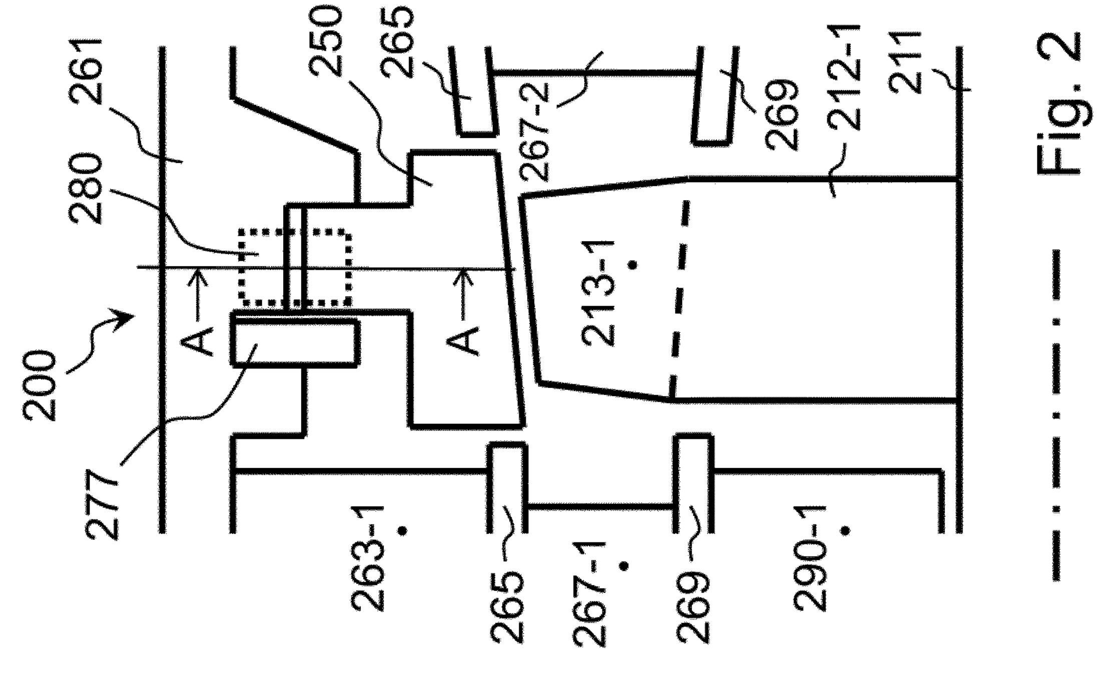
FIG. 2 illustrates a partial schematic longitudinal-section view of a first embodiment of a turbine.

The difference between this first embodiment and a prior turbine may be understood more easily by comparing the structure at the first expansion stage (corresponding to blades 113-1) of turbine 100 in FIG. 1 with the structure at the first expansion stage (corresponding to blades 213-1) of turbine 200 in FIG. 2; it is to be noted that reference numbers of corresponding members in FIG. 1 and FIG. 2 differ by one hundred, so, for example, member 212-1 in FIG. 2 correspond to member 112-1 in FIG. 1.

an improved and inventive turbine 200 of the first embodiment comprises a rotor 210, a stator 260 and a shroud ring 250; unlike prior teachings, the new shroud ring 250 is coupled with the stator 260 but has a certain possibility of movement, therefore, strictly speaking, it cannot be considered a component of the turbine stator.

Rotor 210 comprises at least one array of blades 213-1 being components of a wheel 212-1 fixed to a shaft 211; typically, the rotor comprises several wheels (with blades) fixed to the same shaft. Shroud ring 250 extends around the array of blades 213-1; as it will be better explained with reference to the second embodiment, a shroud ring may extend around one or two or three or more arrays of blades. Stator 260 comprises a casing extending around shroud ring 250; according to the first embodiment, a shell 261 of the casing extends around shroud ring 250.

With reference to FIG. 2, the array of rotor blades 213-1 may be preceded by a first array of stator vanes 267-1 and/or may be followed by a second array of stator vanes 267-2. A flow passage is defined by a stator outer wall 265 and a stator inner wall 269, and inside it there are provided at least the array of rotor blades 213-1 and, possibly, the arrays of stator vanes 267-1 and 267-2. According to the embodiment of FIG. 2, vanes 267-1 are fixed to a first ring of outer wall 265 and a first ring of inner wall 269, and vanes 267-2 are fixed to a second ring of outer wall 265 and a second ring of inner wall 269; furthermore, the first ring of outer wall 265 is coupled with shell 261, and the first ring of inner wall 269 is coupled with a bearing 290-1. According to the embodiment of FIG. 2, shroud ring 250 is positioned axially between the first ring of outer wall 265 and the second ring of outer wall 265.

The geometrical shape of shroud ring 250 according to the first embodiment can be better understood from FIG. 5; alternative shapes and geometries are possible, provided they are configured to provide zero or almost zero leakage of working fluid from around the rotor tips. Shroud ring 250 comprises a first annular inner part 251 in the form of a sleeve (for example a cylindrical or conical sleeve) and a second annular outer part 254 in the form of a flange; first annular inner part 251 serves to provide working fluid seal at tips (214 in FIG. 4) of blades 213-1; the second annular outer part 254 serves to couple with shell 261, in particular with arrangement 270 (see e.g. FIG. 3) of shell 261 that will be described afterwards.

Shroud ring 250 (having an annular shape as can be seen e.g. in FIG. 6), is movably coupled with the casing, in particular with shell 261 (having an annular shape as can be seen e.g. in FIG. 6)), so to allow the casing to thermally expand and contract during operation of the turbine (i.e. during a time interval from start-up to shut-down), thereby varying a radial distance between them. Considering for example FIG. 6, the shell 261 and the shroud ring 250 are concentric and radially spaced; the above mentioned coupling is able to accommodate variations (of e.g. from about 0.5 to about 5.0 mm) in radial distance between shell and ring while maintaining concentricity.

The coupling between shroud ring 250 and casing, in particular shell 261, allows substantially no rotation of shroud ring 250 with respect to the casing. In fact, the casing is configured to substantially fix a relative angular position between the shroud ring and the casing during operation of the turbine (i.e. during a time interval from start-up to shut-down); to this regard, detailed description of arrangement 270 of shell 261 follows.

The coupling between shroud ring 250 and casing, in particular shell 261, allows substantially no axial translation of shroud ring 250 with respect to the casing. In fact, the casing is configured to substantially fix a relative axial position between the shroud ring and the casing during operation of the turbine (i.e. during a time interval from start-up to shut-down); to this regard, detailed description of arrangement 270 of shell 261 follows.

Figure 6:
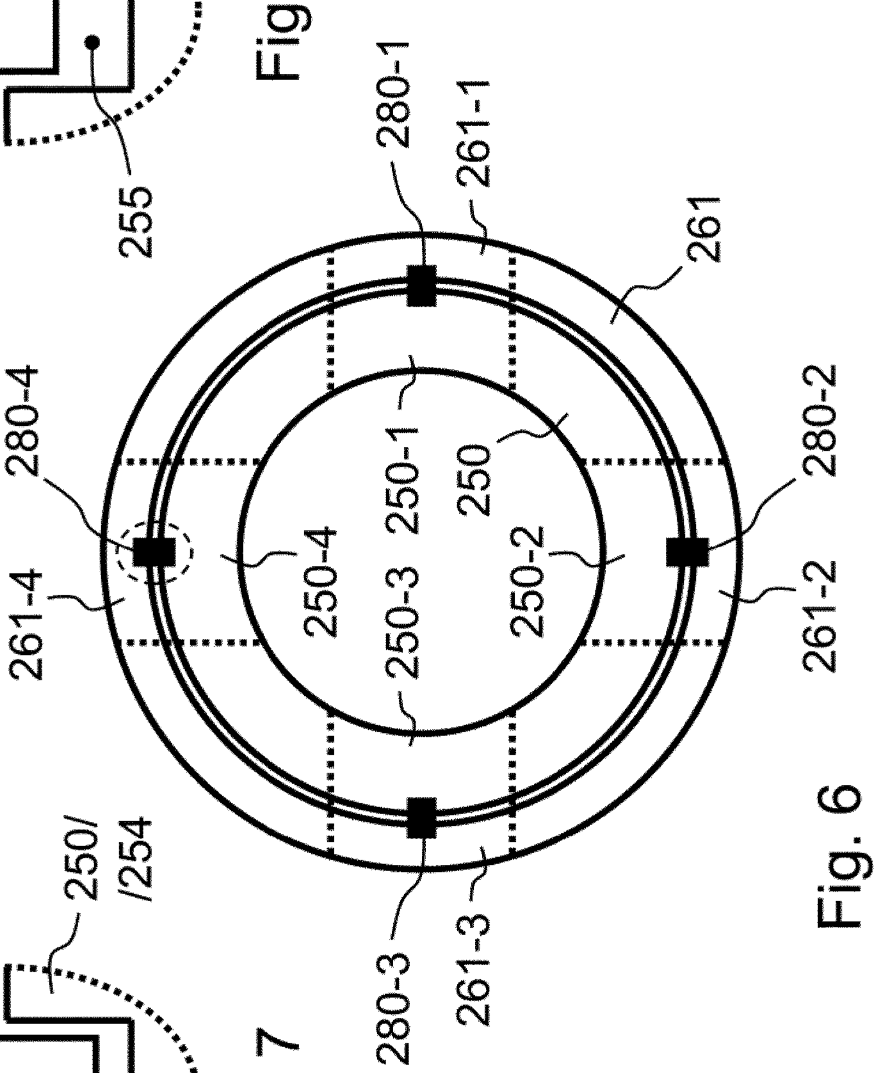
FIG. 6 illustrates a A-A cross-section view of a stator shell, a shroud ring and some keys of the turbine of FIG. 1.

Shroud ring 250 and casing, in particular shell 261, may be considered as divided into parts, as shown for example in FIG. 6; such division may correspond to members joined together or, simply and more typically, different zones of a single piece. Parts 250-1, 250-2, 250-3, 250-4 of shroud ring 250 is slidably coupled with corresponding parts 261-1, 261-2, 261-3, 261-4 of shell 261 of the casing thereby allowing a change in a relative radial position.

Such radial sliding may derive from a part of the shroud ring having a radially-oriented protrusion and a part of the casing having a corresponding radially-oriented recess, the protrusion being arranged to slide in the recess.

Alternatively, such radial sliding may derive from a part of the casing having a radially-oriented protrusion and a part of the shroud ring having a corresponding radially-oriented recess, the protrusion being arranged to slide in the recess.

Still alternatively and preferably and as shown in the figures (see in particular FIG. 7 and FIG. 8), such radial sliding may derive from at least one radially-oriented device, in particular a key 280. The device, in particular key 280, is arranged to slide radially in a recess 255 (see FIG. 7 and FIG. 8) of shroud ring 250, in particular second annular outer part 254, and/or in a recess 262 (see FIG. 7 and FIG. 8) of the casing, in particular shell 261.

Figure 8:
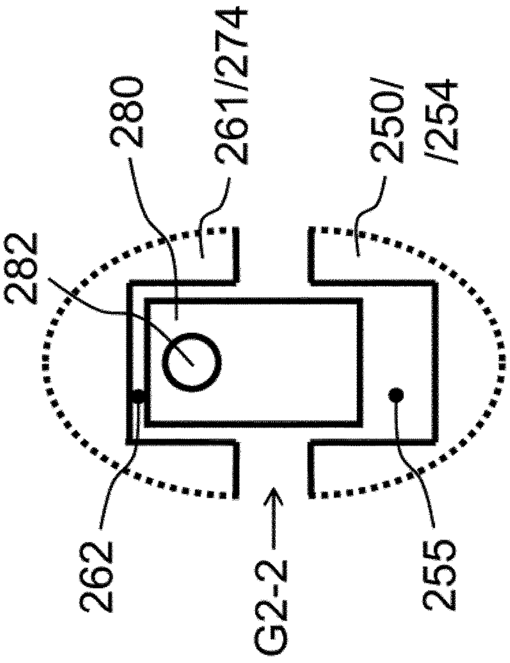
FIG. 8 illustrates a partial enlarged A-A cross-section view of a key of the turbine of FIG. 1 in a second position/condition.
Figure 7:
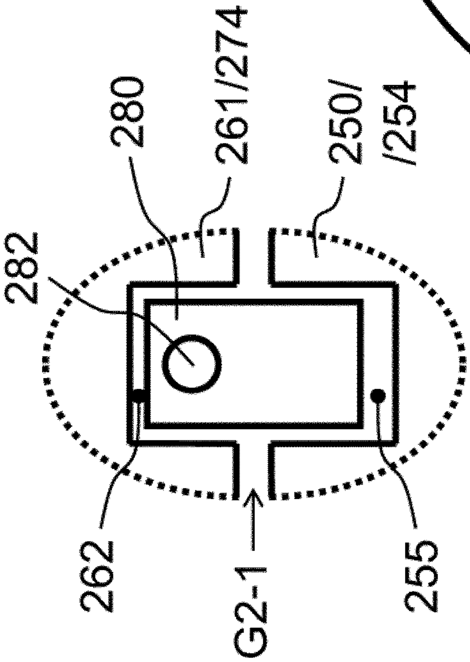
FIG. 7 illustrates a partial enlarged A-A cross-section view of a key of the turbine of FIG. 1 in a first position/condition.

According to this last possible alternative, it is preferred that the device, in particular key 280, is fixed to the casing, in particular shell 261; in the embodiment of FIG. 7 and FIG. 8, a key 280 is fixed to shell 261 through a screw 282. In this case, the device, in particular key 280, is arranged to slide radially (of e.g. from about 1.0 to about 5.0 mm) in a corresponding recess 255 of shroud ring 250; furthermore, there is a certain possibility of (limited) circumferential movement (of e.g. from about 0.1 to about 0.2 mm) between key 280 and recess 255; with reference to FIG. 7 and FIG. 8, "radial" means vertical and "circumferential" means horizontal.

If coupling through device is chosen, typically, several devices are used. In this case, as shown e.g. in FIG. 6, the turbine comprises a plurality of radially-oriented devices, in particular a plurality of keys; according to the first embodiment, four keys 280-1, 280-2, 280-3, 280-4 are used, but a different number is possible from e.g. three to e.g. sixteen. Each device of this plurality is arranged to slide radially in a corresponding recess of the shroud ring and/or in a corresponding recess of the casing.

According to the first embodiment shown in the figures from FIG. 2 to FIG. 8, flange 254 of shroud ring 250 is arranged to couple with arrangement 270 of shell 261 of the casing of the turbine. Arrangement 270 includes a first annular flange 272, an annular rib 274, an annular seat 276 for receiving an annular washer 277 (when the arrangement is mounted), a second annular flange 278; radial recesses 262 are formed in annular rib 274. Flange 254 is arranged to be positioned between first flange 272 and washer 277 with a certain possibility of (limited) axial movement (of e.g. from about 0.2 to about 0.5 mm); it is to be noted that flange 254 of shroud ring 250 is placed in position before placing in position washer 277.

Shroud ring 250 is preferably made of or contains a material having a low CTE (=Coefficient of Thermal Expansion), in particular a CTE lower than about 10 μm/m/° C., preferably lower than about 8 μm/m/° C., more preferably lower than about 6 μm/m/° C.; in this way, its sizes, in particular its radial size, is substantially independent from its temperature. Shroud ring 250 may be made or contain a metal-alloy material or a ceramic material.

On the contrary, rotor 210 and/or stator 260 have sizes, in particular radial size, dependent on their temperature. In fact, rotor 210 and/or stator 260 are typically made of one or more materials having a high CTE, in particular a CTE higher than about 10 μm/m/° C., in particular higher than about 12 μm/m/° C., even more in particular higher than about 14 μm/m/° C. Rotor 210 and stator 260 may be made of one or more metallic materials.

Figure 11:
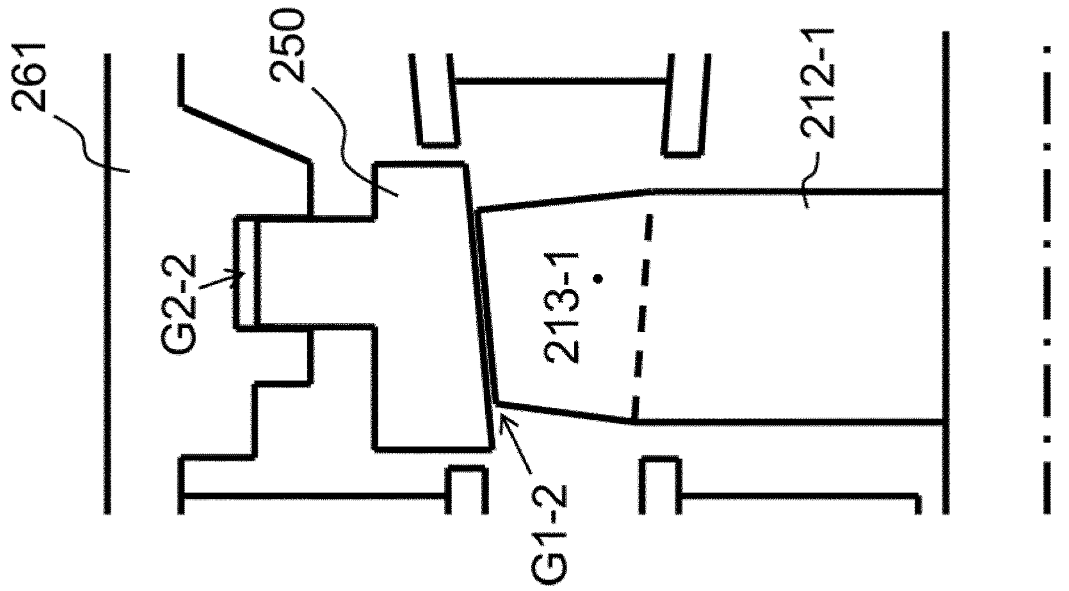
FIG. 11 illustrates a partial schematic longitudinal-section view of the turbine of FIG. 1 in a third operating condition.
Figure 10:
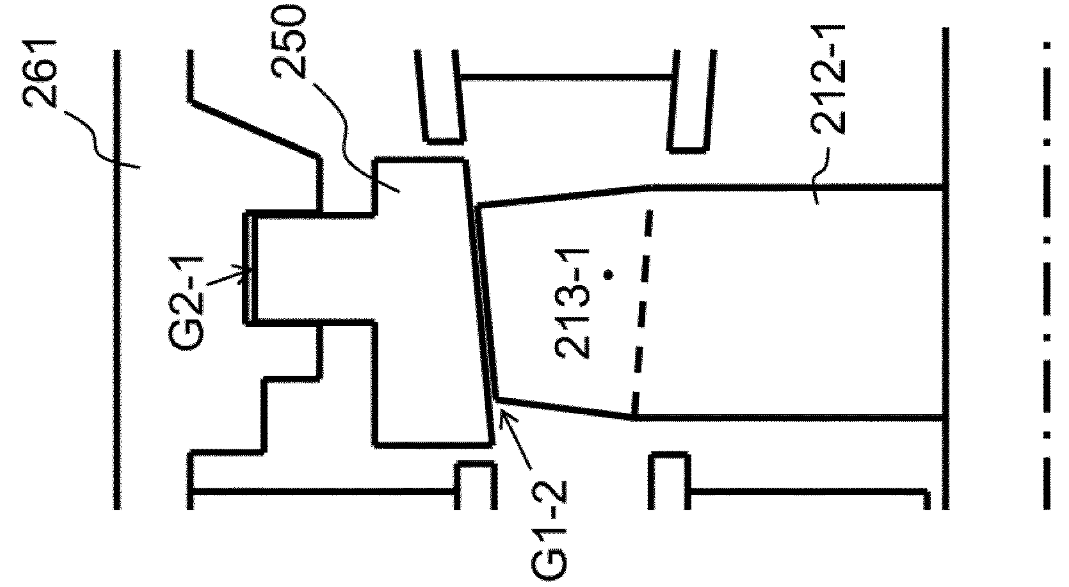
FIG. 10 illustrates a partial schematic longitudinal-section view of the turbine of FIG. 1 in a second operating condition.
Figure 9:
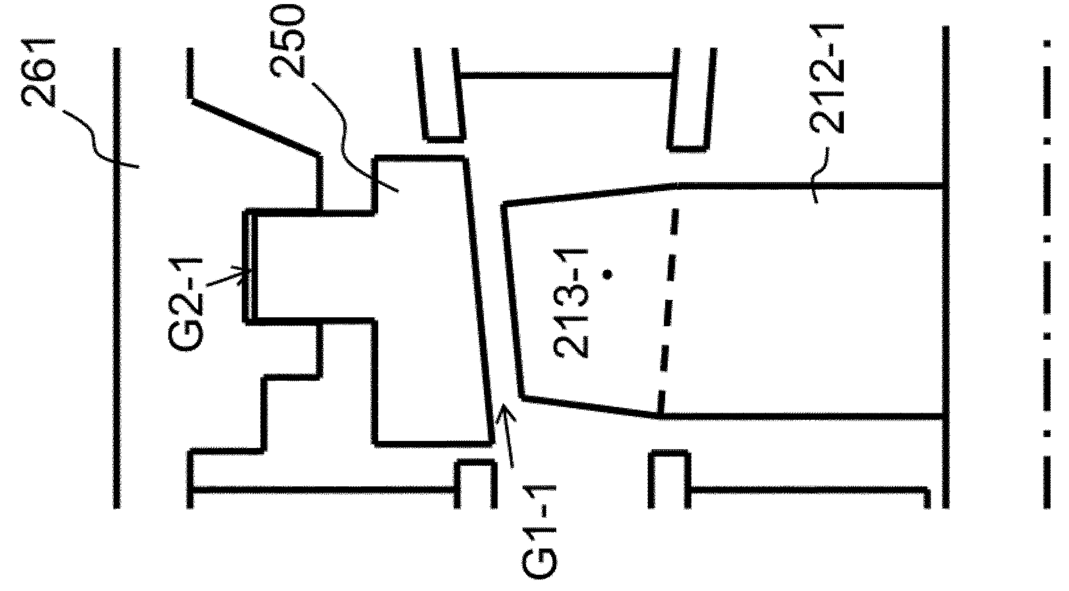
FIG. 9 illustrates a partial schematic longitudinal-section view of the turbine of FIG. 1 in a first operating condition.

Considering FIG. 9 and FIG. 10 and FIG. 11, it is possible to understand how turbine components may vary their radial size during operation of turbine 200; FIG. 9 corresponds to a possible start-up condition when rotor 210 is cold and stator 260 is cold, FIG. 10 corresponds to a possible ramp-up condition when rotor 210 is hot (and expanded) and stator 260 is cold, FIG. 11 corresponds to a possible working condition when rotor 210 is hot (and expanded) and stator 260 is hot (and expanded); it is to be noted that shape, size and position of shroud ring 250 in these three figures are the same. In FIG. 9, there is a wide gap G1-1 between blades 213-1 and shroud ring 250; in FIG. 10, there is a narrow gap G1-2 between blades 213-1 and shroud ring 250; in FIG. 11, there is a narrow gap G1-2 (or even no gap at all) between blades 213-1 and shroud ring 250; gap G1 has decreased due to expansion of rotor 210, in particular of wheel 212-1. Correspondingly, in FIG. 9, there is a narrow gap G2-1 between shroud ring 250, in particular flange 254, and shell 261, in particular rib 274, (see also FIG. 7); in FIG. 10, there is a narrow gap G2-1 between shroud ring 250, in particular flange 254, and shell 261, in particular rib 274, (see also FIG. 7); in FIG. 11, there is a wide gap G2-2 between shroud ring 250, in particular flange 254, and shell 261, in particular rib 274, (see also FIG. 8); gap G2 has increased due to expansion of stator 260, in particular of shell 261.

As just explained, tip regions 214 of blades 213-1 may be in close proximity to an inner region 252 of shroud ring 250 at least at working operating condition of turbine 200.

Alternatively and advantageously, tip regions 214 of blades 213-1 may be in contact with an inner region 252 of shroud ring 250 at least at working operating condition of turbine 200. However, in this case, it is preferred that shroud ring 250 comprises a layer 253 of abradable material at inner region 252, and that blades 213 comprise a layer 215 of abrading (or at least one device of abrading material) at their tip regions 214. In this way, when layer 215 touches layer 253, a light abrasion occurs without damages to the blades and/or the shroud ring. Furthermore, in this case, at least at working operating condition of turbine 200, tip regions 214 of the blades 213-1 are partially penetrated into inner region 252 of shroud ring 250, and, advantageously, there is no leakage of working fluid in particular over the periphery of the blades at least during working operation of the turbine.

Figure 12:
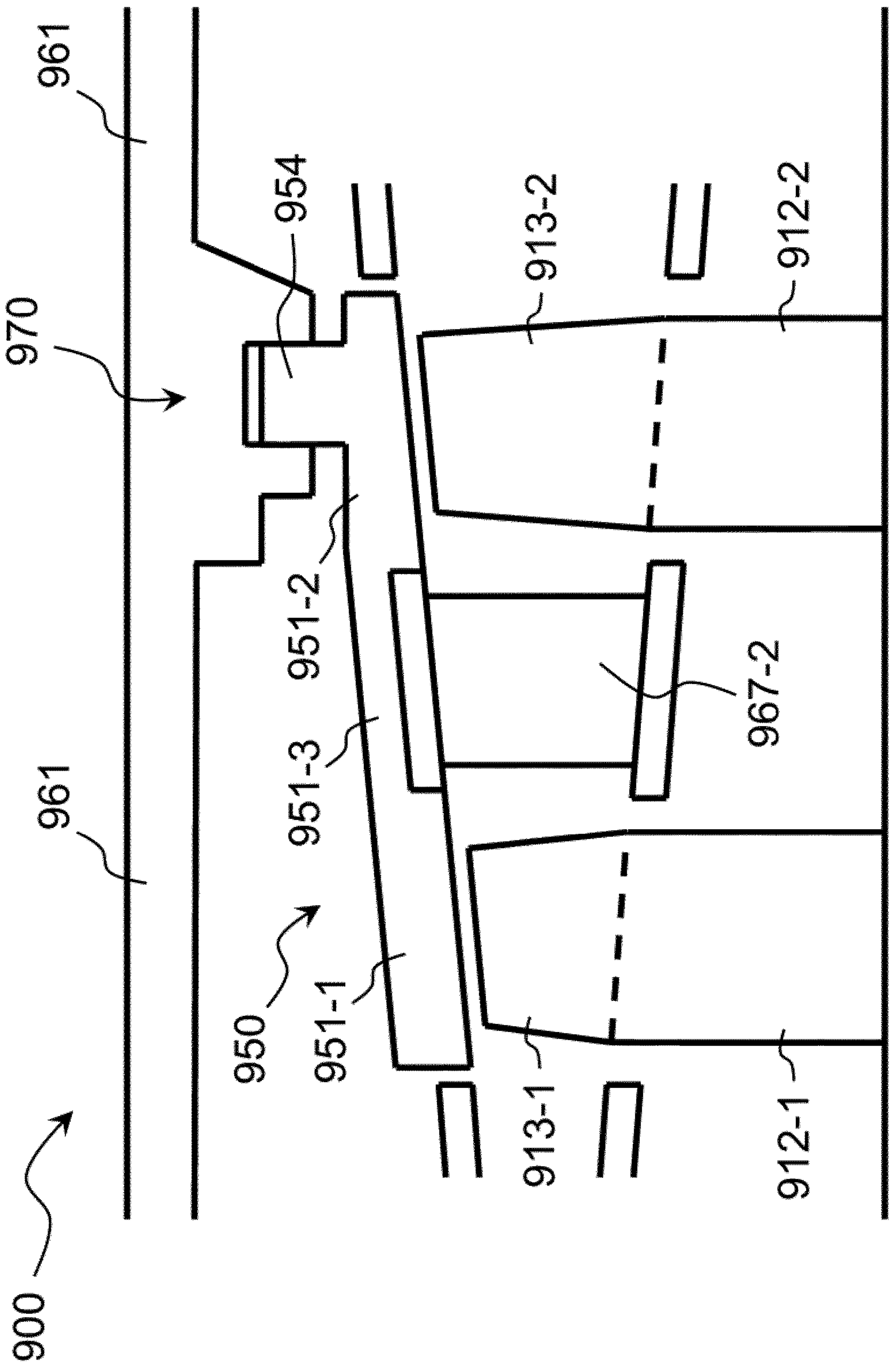
FIG. 12 illustrates a partial schematic longitudinal-section view of a second embodiment of a turbine.

FIG. 12 relates to a second embodiment of a turbine 900 that is similar to the first embodiment. According to this embodiment, a shroud ring 950 (that may be made in one or more pieces) extends around two arrays of rotor blades 913-1 (part of a first wheel 912-1) and 913-2 (part of a second wheel 912-2); alternatively, the shroud ring may extend around three or more arrays of rotor blades. Shroud ring 950 is coupled with e.g. an arrangement 970 of a shell 961 of a stator casing of turbine 900 through a flange 954. A first part 951-1 (in the form of a cylindrical or conical sleeve) of shroud ring 950 extends around a first array of rotor blades 913-1 while a second part 951-2 (in the form of a cylindrical or conical sleeve) of shroud ring 950 extends around a second array of rotor blades 913-2.

Advantageously, an array of vanes 967-2 is fitted in shroud ring 950, in particular in a third part 953 (in the form of a cylindrical or conical sleeve) of shroud ring 950. Vanes 967-2 may be considered stator vanes.

Although the present invention was conceived for being applied to gas turbines (in particular its first expansion stages, more in particular its first expansion stage), it may be well applied also to steam turbines.

As it is apparent from the above description, the first embodiment, the second embodiment and other similar turbines implement a method of limiting leakage between a rotor and a stator in a turbine at least during its working operation.

Figure 13:
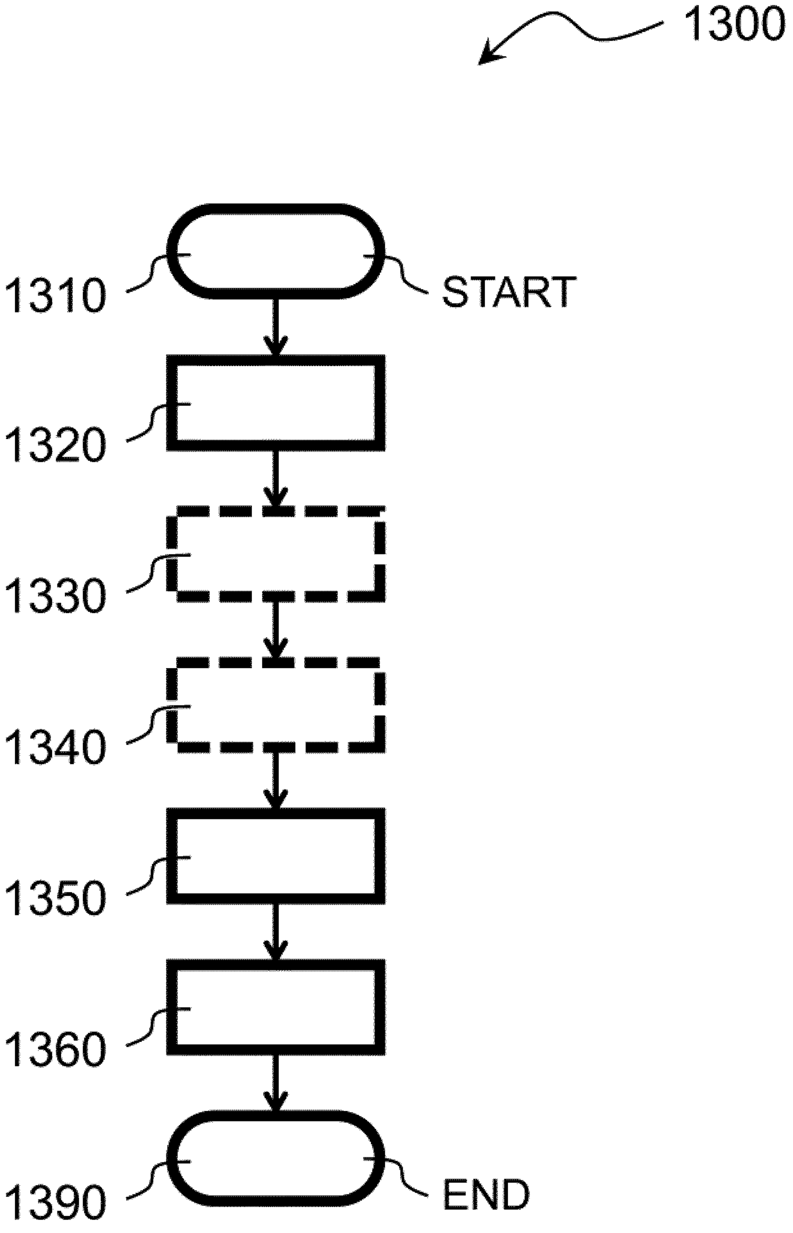
FIG. 13 shows a flow chart of an embodiment of a method of limiting leakage in a turbine.

FIG. 13 illustrates a flow chart 1300 of an embodiment of a method for limiting leakage of working fluid from around rotor blade tips, at least during operation of a turbine. The method begins with a start step 1310 and an end step 1390. This embodiment assumes that the turbine comprises at least one rotor wheel with an array of rotor blades and a stator casing extending around the array of rotor blades; furthermore, the stator casing has radial size dependent from its temperature, and the rotor wheel has radial size dependent from its temperature.

According to this embodiment, the method comprises the steps of:

(step 1320) arranging a shroud ring having radial size substantially independent from its temperature, (step 1350) positioning the shroud ring concentrically about the rotor wheel, between the array of rotor blades and the stator casing, and (step 1360) mechanically coupling the shroud ring with the casing so that coupling is maintained independently from a temperature of the shroud ring and from a temperature of the casing, in particular without damage to the shroud ring and/or the casing;

according to this method, at least at working temperature of turbine, tip regions of the blades are in close proximity (e.g. from about 0.1 to about 1.0 mm) to or in contact with an inner region of the shroud ring.

Typically, the above-mentioned mechanical coupling allows radial movement between the shroud ring and the casing.

The mechanical coupling between the shroud ring and the casing is advantageously made through a plurality of keys.

According to this embodiment, the method may comprise further the steps of:

(step 1330) arranging a layer of abradable material at an inner region of the shroud ring, and (step 1340) arranging layers of abrading or material or at least one device of abrading material at tip regions of the blades;

in this case, herein at least at working temperature of the turbine the tip regions or the abrading devices are partially penetrated into the inner region of the shroud ring through abrasion of the abradable layer by the abrading material.

The invention claimed is:

1. A turbine comprising:

a rotor with a central shaft, a stator, a shroud ring, and a washer, the stator forming a casing having a shell with forming an interior surface with a stepped profile that defines a first annular flange and a second annular flange in between which resides an annular seat adjacent the second annular flange and an annular rib adjacent the first annular flange, wherein the interior surface at the first annular flange is closer to the central shaft than the interior surface at the second annular flange, which is closer to the central shaft than the interior surface at the rib, which is closer to the central shaft than the interior surface at the annular seat, wherein the shroud ring abuts the first annular flange and the washer fits into the annular seat to reside between the shroud ring and the second annular flange, wherein the rotor comprises at least one array of rotor blades, wherein the shroud ring extends around the array of rotor blades, and wherein the shroud ring is movably coupled with the casing so to allow the casing to thermally expand relative to the shroud ring and contract thereby varying a radial distance between the casing and the shroud ring during operation of the turbine.

2. The turbine of claim 1, wherein a part of the shroud ring is slidably coupled with a part of the casing to allow a change in a relative radial position.

3. The turbine of claim 1, further comprising: a key, wherein the key is arranged to slide radially in a recess of the shroud ring and/or in a recess of the casing.

4. The turbine of claim 1, further comprising:

a first key fixed to the shell with a screw, the first key extending into a first recess in the shroud ring that is larger than the first key; and a second key fixed to the shell with a screw, the second key extending into a second recess in the shroud ring that is larger than the second key and spaced angularly away from the first recess by at least 90 degrees, wherein each of the first key and the second key is arranged to slide radially in a corresponding recess of the shroud ring.

5. The turbine of claim 2, wherein said shroud ring comprises a layer of abradable material at an inner region.

6. The turbine of claim 5, wherein one or more of the rotor blades of said array comprise a layer or a device of abrading material at a tip region.

7. The turbine of claim 2, wherein said shroud ring is made of or contains a material having a coefficient of thermal expansion lower than 10 μm/m/° C.

8. The turbine of claim 2, wherein said shroud ring is made of or contains a metal-alloy material or a ceramic material.

9. The turbine of claim 2, wherein the rotor and/or the stator are made of one or more materials having a high CTE.

10. The turbine of claim 2, wherein the rotor and the stator are made of one or more metallic materials.

11. The turbine of claim 1, wherein the stator comprises at least one array of vanes, and wherein said vanes are fitted in said shroud ring.

12. The turbine of claim 2, wherein the turbine is a gas turbine or a steam turbine.

13. A turbine comprising:

a rotor with a central shaft, a stator forming a casing having a shell forming an interior surface with a stepped profile that defines a first annular flange and a second annular flange in between which resides an annular seat adjacent to the second annular flange and an annular rib adjacent the first annular flange, a shroud ring disposed adjacent the first annular flange;

a washer disposed adjacent the shroud ring in the annular seat; and a key extending into both the shell and the shroud ring at the annular rib, wherein the interior surface at the first annular flange is closer to the central shaft than the interior surface at the second annular flange, which is closer to the central shaft than the interior surface at the rib, which is closer to the central shaft than the interior surface at the annular seat, and wherein the key is fixed to the shell with a screw and extends into a recess in the shroud ring that is larger than the key.

14. A turbine comprising:

a rotor with a central shaft, a stator forming a casing having a shell forming an interior surface with a stepped profile that defines a first annular flange and a second annular flange in between which resides an annular seat adjacent the second annular flange and an annular rib adjacent the first annular flange, a shroud ring disposed adjacent the first annular flange;

a washer disposed adjacent the shroud ring in the annular seat; and four keys disposed about the circumferences of the shell and angularly spaced equally from each other, each of the four keys extending into both the shell and the shroud ring at the annular rib, wherein the interior surface at the first annular flange is closer to the central shaft than the interior surface at the second annular flange, which is closer to the central shaft than the interior surface at the rib, which is closer to the central shaft than the interior surface at the annular seat, and wherein each of the four keys is fixed to the shell with a screw and extends into a recess in the shroud ring that is larger than the key.

* * * * *